United States Patent [19]

Marinelli et al.

[11] Patent Number: 5,416,836
[45] Date of Patent: May 16, 1995

[54] DISCONNECT SIGNALLING DETECTION ARRANGEMENT

[75] Inventors: David J. Marinelli, Superior; Kevin M. O'Dell, Boulder, both of Colo.

[73] Assignee: AT&T Corp., Murray Hill, N.J.

[21] Appl. No.: 169,564

[22] Filed: Dec. 17, 1993

[51] Int. Cl.⁶ ............................................. H04M 1/00
[52] U.S. Cl. .................................. 379/377; 379/386; 379/212; 379/282; 379/283; 370/110.1; 370/110.3
[58] Field of Search ............... 379/377, 201, 212, 257, 379/386, 282, 283; 370/110.3, 110.1; 381/49, 43, 48, 50

[56] References Cited

U.S. PATENT DOCUMENTS

| | | | |
|---|---|---|---|
| 4,510,601 | 4/1985 | Delpit et al. | 370/110.3 |
| 4,528,664 | 7/1985 | Cheng et al. | 370/110.3 |
| 4,689,760 | 8/1987 | Lee et al. | 370/110.3 |
| 4,972,490 | 11/1990 | Thomson | 381/49 |
| 5,083,308 | 1/1992 | Gaulke et al. | 379/377 |
| 5,163,050 | 11/1992 | Cromack | 370/110.3 |
| 5,251,208 | 10/1993 | Canniff et al. | 370/110.3 |
| 5,255,314 | 10/1993 | Applegate et al. | 379/212 |
| 5,257,309 | 10/1993 | Brandman et al. | 379/283 |
| 5,311,575 | 5/1994 | Oh | 379/377 |
| 5,319,703 | 6/1994 | Drory | 379/351 |
| 5,321,745 | 6/1994 | Drory et al. | 379/351 |

OTHER PUBLICATIONS

D. L. Thomson, "A Multivariate Voicing Decision Rule Adapts to Noise, Distortion, and Spectral Shaping", *IEEE International Conference on Acoustics, Speech, and Signal Processing* (ICASSP87) Dallas, Tex. (1987), pp. 6.10.1–6.10.4.

A. A. Afifi et al., "Statistical Analysis A Computer Oriented Approach", Second Edition, New York, N.Y. (1979), Academic Press, Inc., pp. 288–302.

L. R. Rabiner et al., "Digital Processing of Speech Signals", Prentice-Hall, 1978, Bell Laboratories, Inc., pp. 396–453.

CCITT Recommendations (Blue Book) Fascicle, II.2, Recommendation E.182 (1988), pp. 133–150, 243–253.

*Primary Examiner*—James L. Dwyer
*Assistant Examiner*—Jacques M. Saint-Surin
*Attorney, Agent, or Firm*—David Volejnicek

[57] ABSTRACT

A substantially-universal detector (FIG. 2) of far-end call disconnect-indicative tones detects the foreseeable forms of tone-based signalling of remote-end call disconnect that are likely to be employed anywhere in the world, without reconfiguration or reprogramming for different tones or countries. Implemented in the digital signal processor (DSP 30) of port circuits (14, 20) of switching systems (11) or adjunct processors (12), the detector determines parameters (204) of signals carried by the call to the near end and uses them, along with already-present linear predictive coding (LPC) predictor coefficients (202) and indications of energy (203) in the signals, in a multivariate classification (230) of call progress tones from other tones. When presence of any call progress tones is thus detected substantially without interruption for a predetermined minimum time in the received signals, the call is considered (240) to have been disconnected at the far end. In response, a voice messaging system (VMS) adjunct processor, (12) deletes any recording of the call progress tones from the end of the recorded message.

46 Claims, 3 Drawing Sheets

DISCONNECT SIGNALLING DETECTION ARRANGEMENT

TECHNICAL FIELD

This invention relates generally to telecommunications systems, and specifically relates to detection of control signalling in voice communications arrangements such as telephone systems.

BACKGROUND OF THE INVENTION

It is known to use adjunct processors in conjunction with switching systems in order to supplement and enhance the telecommunications services provided by the switching systems. For example, an AT&T AUDIX® voice messaging system is often used with an AT&T Definity® private branch exchange (PBX) to provide users with voice messaging capabilities.

To enable e adjunct processor to perform its functions, generally the switching system supplies the adjunct with requisite information, such as control information or detection of call-progress change of state. However, in instances where the switching system is either unable to obtain the information required by the adjunct processor (for example, is unable to detect call-progress signals) or is unable to communicate this information to the adjunct (for example, because the switching system and the adjunct processor do not use the same communication scheme, that is, do not "speak the same language"), the adjunct processor must obtain the requisite information on its own, or do without it.

Internationally, one of the more difficult call-progress changes of state to detect properly is call disconnection at the far end of the call (that is, by the party to the call other than the one trying to do the delecting). Sometimes, no indication of far-end call disconnection is given at all, other than that the call falls silent. In some countries, digital signalling on digital trunks and out-of-band analog signalling on analog trunks are the only used forms of signalling far-end call disconnection. In many other countries, in-band analog signalling, and particularly tone-based signalling, on analog trunks is principally used to signal far-end call disconnection. Hence, switching systems and other equipment designed for use in the former set of countries generally are not readily able to detect far-end call disconnection when put to use in the latter set of countries. Moreover, even equipment designed to detect tone-based signalling may find it difficult to work properly in the latter set of countries, because the signalling may vary from country to county. What is worse, official requirements for such signalling may not be adhered to in many countries, and so the signalling may not even be consistent within a country. The signalling may actually depend on the particular switching system that is serving the far end of the call and generating the signalling, so that the near-end equipment may, in effect, receive different signalling for every call! The magnitude of this problem can be appreciated from the fact that the CCITT (now the ITU) lists over 50 different signals that can be used as far-end call disconnect-indicative signals in the international arena!

Various techniques have been developed over time to detect analog signalling of disconnect on analog links. In the case where no positive indication of call disconnection is given, detection of the fact that a call has fallen silent for a predetermined minimum period of time has normally been used as an indication of call disconnection. This technique has the disadvantage of not being able to distinguish between long pauses in the conversation or other call traffic, and true call disconnection. Moreover, it wastes resources that are used in serving the call after the call has been disconnected but before the long period of call silence that is interpreted as call disconnection expires.

Some switching systems provide a current-level fluctuation on an analog telephone link to signal call disconnect, and circuits have been developed to detect this fluctuation. However, many switching systems do not provide this fluctuation, some provide it only on telephone lines and not on telephone trunks, and such a fluctuation normally cannot be passed through a telephone network. Hence, monitoring, for the presence of a current-level fluctuation as a way to detect remote call disconnect has limited usefulness.

Almost all known switches eventually return an intercept tone, a reorder tone, a dial tone, or some other call-control tone across an analog call path of a call that stays connected after the local party to the call has hung up. Hence, detection of this tone-based signalling at the other end of the call is a good candidate for generally-applicable detection of far-end call disconnect. And, indeed, various arrangements have been developed for this purpose. They are of two basic types.

Energy-detection arrangements use an energy detector to detect a constant energy pattern in signals present at any time on a telephone line. Energy detectors are well known in the art; for example, digital signal processors (DSPs) commonly perform energy detection as part of their functions. The variance in the detected pattern is then compared against a threshold. If the variance falls below the threshold for a predetermined amount of time, this is taken as an indication of the presence of a call-control signal as opposed to call traffic, under the theory that call-control tones on average have a highly regular energy pattern as compared to voice signals. However, this may be an unfounded assumption. The telephone line may be used to carry traffic signals other than voice, such as music or data, that may exhibit energy characteristics very similar to those of control tones. Hence, this approach is error-prone.

To compensate for the problems of energy-detection arrangements, frequency-detection arrangements employ notch (single-frequency passband) filters at the input of the energy detector. The filters filter out all signal frequencies present on the telephone line other than the one or two frequencies that, in theory, constitute the call control tone that indicates far-end call disconnect. Only the selected one or two frequencies are then supplied to the energy detector, which functions as described previously. These arrangements are made error-prone by their dependence on the disconnect-indicative signal having a very precise and constant frequency or frequencies. They are therefore totally unsuitable for use in countries where the disconnect-indicative signal may fluctuate or, worse yet, be any one of a plurality of different signals. Furthermore, a different one of these arrangements must be designed, built, supplied, maintained, etc. for every country or region of interest that uses a different disconnect-indicative signal—an expensive proposition. Finally, the very sharp narrowband filtering required by these arrangements is very expensive when implemented in hardware and very computationally intensive when implemented in software.

Therefore, what the art needs but lacks is a substantially-universal detector of disconnect-indicative tones.

SUMMARY OF THE INVENTION

This invention is directed to solving the problems and meeting the needs of the prior art. Generally according to the invention, an arrangement for detecting far-end call disconnect indication detects substantially any disconnect-indicative tones by analyzing characteristics, other than just energy, of the entire, or at least a whole partial, range of received signals carded by the call in order to distinguish between traffic signals and call-control signals, and in response to detection of any call-control signals it treats the call as having been disconnected at the far end. Multivariate classification is particularly suited for this type of analysis. Specifically according to an aspect of the invention, an arrangement for detecting, at a near end of a call that extends between the near end and a far end, a disconnection of the call at the far end indicated by a call-control signal received at the near end, functions as follows. It receives signals carried by the call to the near end, and analyzes characteristics of a whole range of frequencies of the received signals, other than just energy, carded within the range of frequencies, to distinguish by the analysis between traffic signals and call-control signals carded within the range of frequencies. Then, in response to a determination made by the analysis that the call carries a call-control signal within the frequency range, it treats the call as having been disconnected at the far end.

The arrangement has the advantage of being a substantially-universal detector of disconnect-indicative tones, in that it detects the foreseeable forms of tone-based signalling of remote-end call disconnect that are likely to be employed anywhere in the world. As such, it also does not require reconfiguration or reprogramming for individual countrie's or localitie's customary disconnect signalling. Rather, it may be used without change to detect tone-based far-end call disconnect signalling substantially anywhere.

Moreover, the arrangement is not limited in its applicability to detecting disconnect-indicative signals, but may be employed to detect substantially any call-control signals for any purpose. According to this aspect of the invention, an arrangement for detecting information about a call that is indicated by an individual call-control signal performs a multivariate signal-classification on a whole range of frequencies of signals carded by the call to distinguish any of a plurality of call-control signals from other signals carried by the call within the range of frequencies, and in response to a determination made by the multivariate signal-classification that the call carries any of the plurality of call-control signals within the frequency range it indicates that the information about the call has been detected.

In the form described below as an illustrative embodiment thereof, the arrangement has relatively low complexity in that it relies upon hardware and computational capabilities that are already present in its intended environment for other purposes, and needs only limited computational resources that are available and unused in its intended environment. Hence, it is easy and inexpensive to implement, and even to retrofit into existing systems. Furthermore, when used with call-traffic recording systems such as voice messaging systems, the arrangement provides for deletion of any recorded disconnect-indicative tones from the end of the recorded message or other recorded call traffic. It thus eliminates the annoyance to the recipient of the recording of having to listen to this tone. And it eliminates the previously-mentioned waste of resources involved in recording, storing, and processing of this tone as a part of the message or other call-traffic record.

These and other advantages and features of the invention will become more apparent from the following description of an illustrative embodiment of the invention taken together with the drawing.

DETAILED DESCRIPTION

Figure 1:
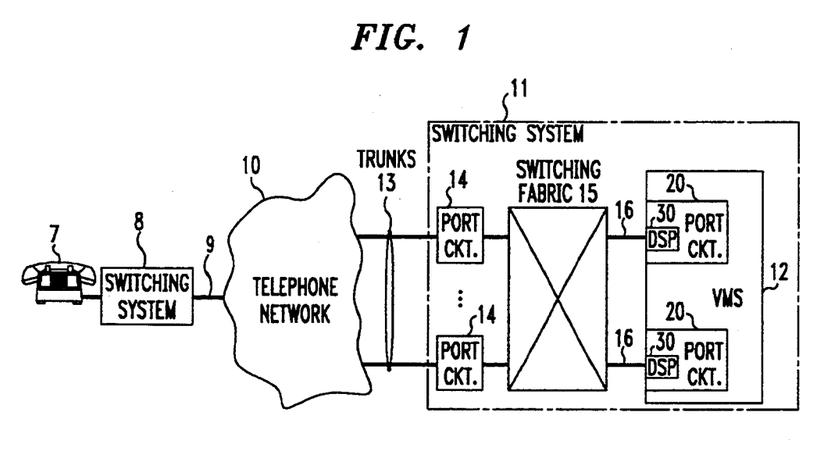
FIG. 1 is a block diagram of a telecommunications switching system that embodies an illustrative example of the invention.

FIG. 1 shows a conventional telephone network 10 that includes switching systems 8 and 11. Switching systems 8 and 11 are interconnected with the rest of telephone network 10 by trunks 9 and 13, respectively. For purposes of this discussion, switching system 8 is referred to as the "far-end" switching system, and switching system 11 is referred to as the "near-end" switching system. Near-end switching system 11 includes port circuits that couple switching system 11 to trunks 14, and a switching fabric 15 for making and breaking desired call connections. Far-end switching system 8 is structured similarly. Switching system 11 is also equipped with an adjunct processor such as a voice-messaging system (VMS) 12. VMS 12 is coupled to switching fabric 15 by means of port circuits 20 that form connections 16.

Illustratively, switching system 11 is an AT&T Definity ® private branch exchange (PBX), and VMS 12 is an AT&T Definity Audix ® VMS that is physically incorporated into the Definity PBX. In an alternative embodiment, VMS 12 may be a stand-alone unit, such as an AT&T Audix R1 VMS, that is coupled to switching fabric 15 via connections 16 that comprise telephone lines and port circuits of switching system 11, as is more conventional in the industry.

In order to operate properly, VMS 12 must be able to determine when a call that is being served by VMS 12 has been disconnected at the far end. For example, when VMS 12 is recording a message from a caller who is calling from a telephone 7 served by far-end switching system 8 and that caller hangs up before the maximum message length allowed by VMS 12 has been reached, VMS 12 needs to determine that the caller has hung up so that it can cease message recording for that call. Otherwise, VMS 12 will continue recording unwanted material, such as silence, call-control tones (also alternatively referred to herein as call progress tones), or whatever else appears on connection 16 that is being used by the call. Not only is this of great annoyance to the message's recipient, but it also wastes VMS 12 resources. It wastes ports 20 which cannot be used for serving other calls while they are being used to record the unwanted material, it wastes storage space that is used to store the unwanted material, and it reduces system capacity and response time that are consumed in processing the unwanted material.

As was mentioned previously, VMS 12 can either detect far-end call disconnection itself, or it can depend upon near-end switching system 11 to do the detecting and inform VMS 12 thereof. But in the international arena, where any one or more of up to at least 50 tones can be used by far-end switching system 8 to signal call disconnect across analog trunks 9 and 13, proper detection of call disconnect is a problem for near-end switching system 11 and/or VMS 12. Therefore, according to the invention, the far-end disconnect detection arrangement of FIG. 2, which is capable of detecting any one or more of those tones, is included in either port circuits 14 of switching system 11 or port circuits 20 of VMS 12. The disconnect tones may be single tones, dual tones, or amplitude-modulated tones, lying mostly within the normal call-progress signal band of 300 to 650 Hz. The tones may be either continuous or cadenced. (Cadence is the frequency sequence, that is, the on/off pattern, of the associate frequencies and amplitudes.) Generally, they are presumed to be those listed as busy/reorder tones or dial tones in CCITT Recommendations (Blue Book) Fascicle, II.2, Recommendation E.182 (1988), for any given country. Accordingly, the far-end disconnect detection arrangement monitors every call for the presence of a continuous or cadenced regular tone having a frequency or frequencies between approximately 300 Hz and 650 Hz. When such a tone is detected and verified with confidence over time, the call is considered to have been disconnected at the far end. In response, the call is treated at the near end as a disconnected call; for example, it is disconnected (dropped) at the near end as well. Additionally, steps are taken to erase the disconnect-indicative tone from the end of the recorded message.

Figure 2:
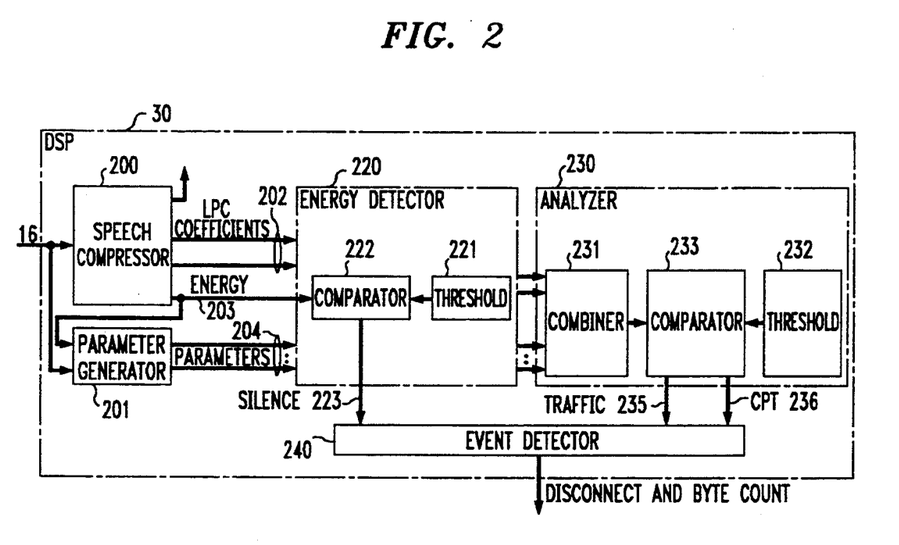
FIG. 2 is a block diagram of the functional structure of a far-end disconnect detection arrangement inside a digital signal processor (DSP) of a voice messaging system (VMS) of the telecommunications switching system of FIG. 1.

Tones may be present during the time that VMS 12 is serving the call that should not trigger far-end disconnect detection. These include the following: dual-tone multi-frequency (DTMF, or Touch-Tone) tones, periodic pulse metering tones (charge tones for pay phones or toll calls), telecommunications device for the deaf (TDD) tones, fax signalling and data transmission tones, and modem signalling and data transmission tones. These tones, however, lie outside of the 300–650 Hz band in which far-end disconnect signals are expected to appear. (Hence, they have different spectral characteristics from the tones of interest.) Operator intervention tones also may be present, and these lie in the frequency band of interest. However, treatment of these tones by VMS 12 as if they were call-disconnect tones is the correct response in most instances. Call-waiting tones also appear within this frequency range. However, call-waiting is a user-oriented feature, and not one to which a VMS 12 would subscribe. Hence, call-waiting tones will not be present in the signal stream received by VMS 12.

The far-end disconnect detection arrangement is suitably implemented via a digital signal processor (DSP). VMS 12 already includes DSPs 30 in its port circuits 20 for purposes of conventional VMS 12 operation, wherein DSPs 30 perform speech compression and compressed-speech expansion functions. In this illustrative example, therefore, it is preferable to implement the far-end disconnect detection arrangement in port circuits 20 of VMS 12 where it can make use of the already-present DSPs 30, such that no additional hardware is required for its implementation.

Figure 3:
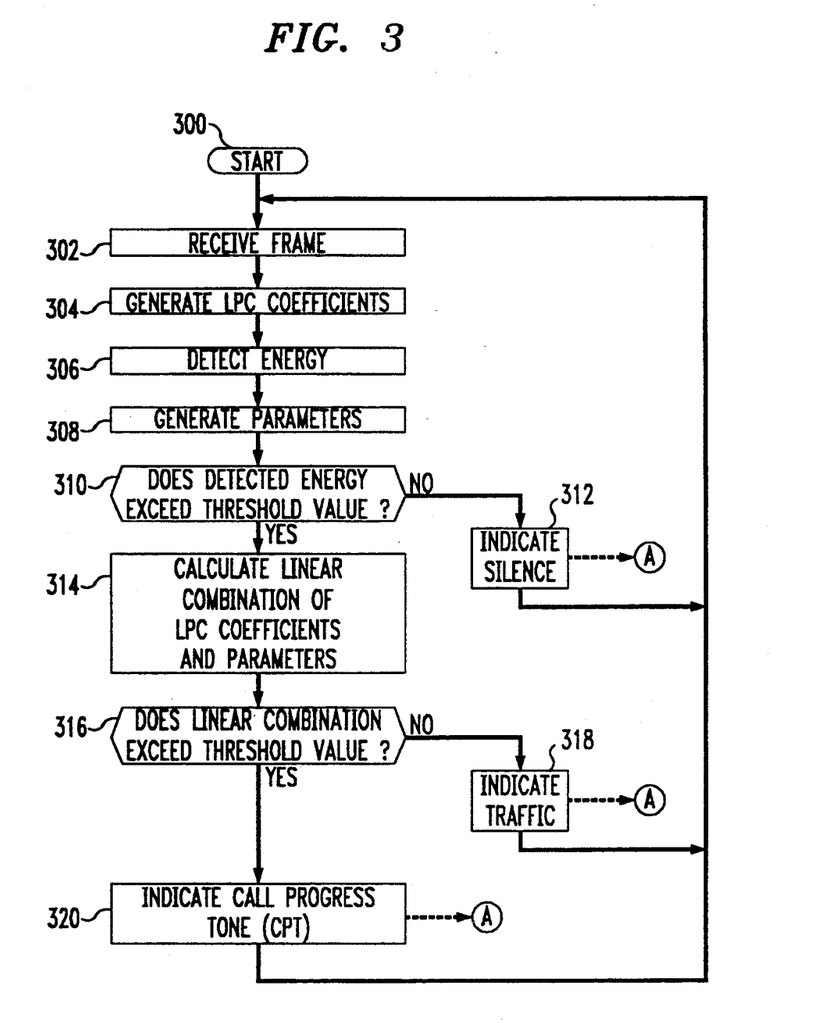
FIG. 3 is a flow diagram of the operation of energy detector and analyzer functions of the far-end disconnect detection arrangement of FIG. 2.

FIG. 2 shows in block diagram form the functional structure of the far-end disconnect detection arrangement inside a DSP 30. DSP 30 is illustratively the AT&T DSP-32C DSP. DSP 30 is coupled to a connection 16 across which it receives both speech signals and call-control signals. The call-control signals include the busy, reorder, dial, and other tones that are used by far-end switching systems 8 to indicate call disconnect. FIG. 3 shows the flow of operations of DSP 30 that constitute the far-end disconnect detection arrangement. FIGS. 2 and 3 should be referred to together during the discussion that follows.

The signals received on connection 16 are input to a conventional speech compressor function 200. In the AT&T DSP-32C DSP, function 200 applies linear predictive coding (LPC) algorithms to the entire frequency range of the received signals to generate compressed speech signals. Following start up of DSP 30 operation, at step 300, function 200 receives each time segment of the received signals referred to as a frame, at step 302. In this illustrative example, the received signals are sampled 8000 times per second, and each frame contains 192 samples, or 24 milliseconds, of the received signals. As part of its conventional operation, function 200 generates, for the entire frequency range of the signals present in each frame, the a1 and a2 10th-order LPC predictor coefficients 202 computed from the autocorrelation using Durbin's recursion and which characterize the spectrum of the received signals, at step 304. For how LPC predictor coefficients are computed, see L. R. Rabiner and R. W. Schafer, *Digital Processing of Speech Signals* (Prentice-Hall, Inc., 1987) Ch. 8, equations 8.21 and 8.67–8.71. Function 200 also conventionally generates an energy indication 203 which shows the amount of energy present within the entire frequency range of signals within each frame, at step 306. The energy is computed as the square root of the sum of the squares of the samples (signal amplitudes) within a frame.

The signals received on connection 16 are also input, along with energy indication 203, to a parameter generator function 201 for generation of a set of parameters 204 across the entire frequency range of signals within each frame, at step 308. In this illustrative example, the following parameters are generated and used: peak ratio (PR), which is the maximum signal amplitude of signals within the frame divided by the energy of signals within the frame; zero crossings (ZC), which is the number of times that the signals cross the zero-amplitude axis during the frame; and maximum zero crossings (MZC), which is the maximum number of samples appearing between sequential zero crossings anywhere within the frame.

In a general environment, as well as in the environment of this specific illustrative example, a substantially-greater number of parameters may be computed. The selection of parameters that are actually used is based on how good each one is in terms of differentiating a desired class of signals (call-control tones such as reorder and dial tones) from another (speech). This determination is made by the statistical process of discriminant analysis. For a general description of discriminant analysis as applicable hereto, see A. A. Afifi and S. P. Azen,

*Statistical Analysis, A Computer Oriented Approach*, 2d ed. (Academic Press, Inc. 1979) pp. 289–302. For an application of discriminant analysis to a collection of unreliable predictors to select those leading to a reliable prediction, see D. L. Thomson, "A Multivariate Voicing Decision Rule Adapts to Noise, Distortion, and Spectral Shaping", *Proceedings of the IEEE International Conference on Acoustics, Speech, and Signal Processing* (ICASSP87), Dallas, Tex. (1987), pp. 6.10.1–6.10.4, and U.S. Pat. No. 4,972,490. The following paragraph offers some general guidelines for selecting parameters.

As stated above, the problem is one of classifying signals. With a multivariate approach one needs to:
  Determine which parameters are appropriate, and
  Determine how much value, or weight, to place on each parameter relative to the others.

The following are the guidelines used to select parameters:
  Low complexity—a parameter should either be already available, or require a small amount of additional computation to obtain.
  A parameter should have a reasonable expectation of being a good discriminator (i.e., have a large weight).

The second requires some reflection on the differences between voice, frequency-shift keying (FSK) modem signals, and silence/background noise:
  Background noise is of lower energy per frame (call progress tone signals are >40 dBm0, with normal network losses).
  FSK modem signals are tonal in nature, but have the carrier frequency >650 Hz. Higher bit-rate modem signals (using other modulation schemes) appear as random noise. In general, modem signals have significant energy above 650 Hz (in contrast to most call progress tone signals).
  Voice signals show more variation, and tend to have a more complex spectrum. Voice signals normally occupy the same frequency range as call progress tone signals (i.e., the majority of the energy is in the 300–650 Hz range). Also, the fundamental frequency for high-pitched speakers can be in the 300–400 Hz range.

A large concern is that the detector might be misled by certain voice signals, much as mid-network dual-tone multi-frequency (DTMF) detectors are. Although it is not initially activated on outgoing calls because of the potential for interpreting dial tone, ringback, or busy tone as disconnect tone, and is activated only when the called party answers, the detector is active during the entire voice-recording session and so any voice signal that activates the detector will cause a premature disconnect. Even DTMF detectors may be misled, even though each DTMF consists of two independent tones. Call progress tone-like signals are much more likely to occur in speech, increasing the possibility of producing the incorrect result for an individual frame. Thus, the event detector allows for some mis-classified frames.

Outputs 202–204 of functions 200 and 201 are applied as inputs to an energy detector function 220. Function 220 uses only energy indication 203 and acts as a gate with respect to the other inputs. Energy detector function 220 includes a comparator function 222 which compares energy indication 203 against a threshold value 221, at step 310. Threshold value 221 is selected, based on empirical knowledge of the characteristics of the system of FIG. 1, as the borderline between mere noise and actual traffic and control signals on connection 16. In this illustrative example, threshold value 221 is set at a digital level equivalent to −40dBm0, or forty decibels below one milliwatt into 600 ohms. If energy indication 203 is found by comparator 222 to fall below threshold value 221, the signals being received on connection 16 are considered to be mere noise. Energy detector 220 therefore generates a signal 223 that indicates that silence is being received, at step 312. In such a case, no use needs to be made of the other inputs to energy detector 220, and so energy detector 220 blocks these inputs from being processed further. The flow of operation in FIG. 3 therefore returns to step 302 to process the next received frame of signals.

If energy indication 203 is found by comparator 222 at step 310 to equal or exceed threshold value 221, the signals being received on connection 16 are considered to be traffic or call-control signals. Energy detector 220 therefore allows the inputs 202 and 204 to pass through to an analyzer function 230 for further processing that will determine whether these signals are traffic signals or call-control signals.

Analyzer 230 performs a multivariate classification of call profess tones having a frequency or frequencies between about 300 Hz and 650 Hz from other signals. Analyzer 230 includes a combiner 231 that generates a linear combination of inputs 202 and 204, at step 314. The linear combination function used by combiner 231 is a multivariate discrimination function $$|\overline{D}*x - \overline{u1}|$$

wherein
  $\overline{D}$ is a 5-by-5 discriminant array (a matrix) of weighting factors,
  x is an observation vector consisting of the ordered list of parameters and LPC predictor coefficients (PK, ZC, MZC, a1, a2) that were discussed above,
  * represents a matrix-to-vector product operation,
  − represents a subtraction operation,
  $\overline{u1}$ is a 5-by-1 centroid array, and
  | | is the Euclidean distance function (the square root of the sum of the squares).

The discriminant array is a matrix of pre-computed values of parameter and coefficient weighting factors obtained from discriminant analysis of a set of training observation vectors of traffic samples, such as voice traffic samples, and a set of training observation vectors of call-control tones, specifically call progress tones having a frequency or frequencies between 300 Hz and 650 Hz that may be used to indicate far-end call disconnect. The purpose of the discriminant analysis is to maximize the Mahalanobis distance between the two training populations. Illustratively, the discriminant analysis is performed and the discriminant array is generated by a commercial statistical analysis software package such as Splus of Statistical Sciences Inc. In this illustrative implementation, the discriminant array has the values shown in Table 1.

TABLE 1

|   | 1 | 2 | 3 | 4 | 5 |
|---|---|---|---|---|---|
| 1 | −1.273951 | −0.8052485 | −1.102561 | 0.1465691 | 0.5439084 |
| 2 | −0.01761624 | 0.01751214 | 0.1373517 | −0.02052944 | 0.03338927 |

TABLE 1-continued

|   | 1 | 2 | 3 | 4 | 5 |
|---|---|---|---|---|---|
| 3 | −0.06975721 | 0.08181304 | 0.0405527 | −0.05851042 | −0.02898057 |
| 4 | −0.3342038 | 0.9969190 | −0.7572915 | 1.582759 | 0.8585352 |
| 5 | −0.00641842 | 1.667676 | −1.191743 | −0.09951566 | 1.577699 |

The centroid array is a pre-computed vector of values that represent the arithmetic mean of a transformed data cluster of the set of training observation vectors of call-control tones. The transformed data cluster is obtained by multiplying each training observation vector by the 5-by-5 array $\overline{D}$. The centroid array may likewise be computed by the same discriminant analysis software package as is used to compute the discriminant array. In this illustrative implementation, the centroid array has the values shown in Table 2.

TABLE 2

|   | 1 | 2 | 3 | 4 | 5 |
|---|---|---|---|---|---|
| 1 | −3.013653 | 0.5438987 | −0.905962 | −1.034094 | 1.927946 |

Combiner 231 supplies the combination to a comparator function 233 which compares the combination against a threshold value 232, at step 316. Threshold value 232 is chosen empirically, and is taken to be the square root of 0.8 in this illustrative embodiment.

If the combination exceeds or equals threshold value 232, the signals received on connection 16 are considered to be traffic signals (that is, voice), and analyzer 230 generates an output signal 235 indicative of presence of traffic signals, at step 318. If the combination falls below threshold value 232, analyzer 230 generates an output signal 236 indicative of presence of call progress tones (CPT), at step 320. Following step 318 or 320, the flow of operation in FIG. 3 returns to step 302 to process the next received frame of signals.

The silence, traffic, or CPT detection signals that are generated as outputs 223, 235, and 236, respectively, are supplied to an event detector function 240. Event detector function 240 ensures that receipt of a call progress tone has been detected substantially without interruption for a minimum predetermined amount of time before an indication of detection of far-end disconnect is given to the rest of VMS 12. Illustratively, the detection of call progress tone must occur for at least 40 frames, or 960 milliseconds, and it may not be interrupted by more than 6 consecutive frames of detected traffic or 30 continuous frames (720 milliseconds) of detected silence. Event detector function 240 also keeps track of the total number of frames over which the call progress tone has been detected, and causes VMS 12 to subtract this number of bytes from the stored message, so as to truncate the recording and delete the call progress tone from the recorded message.

Figure 4:
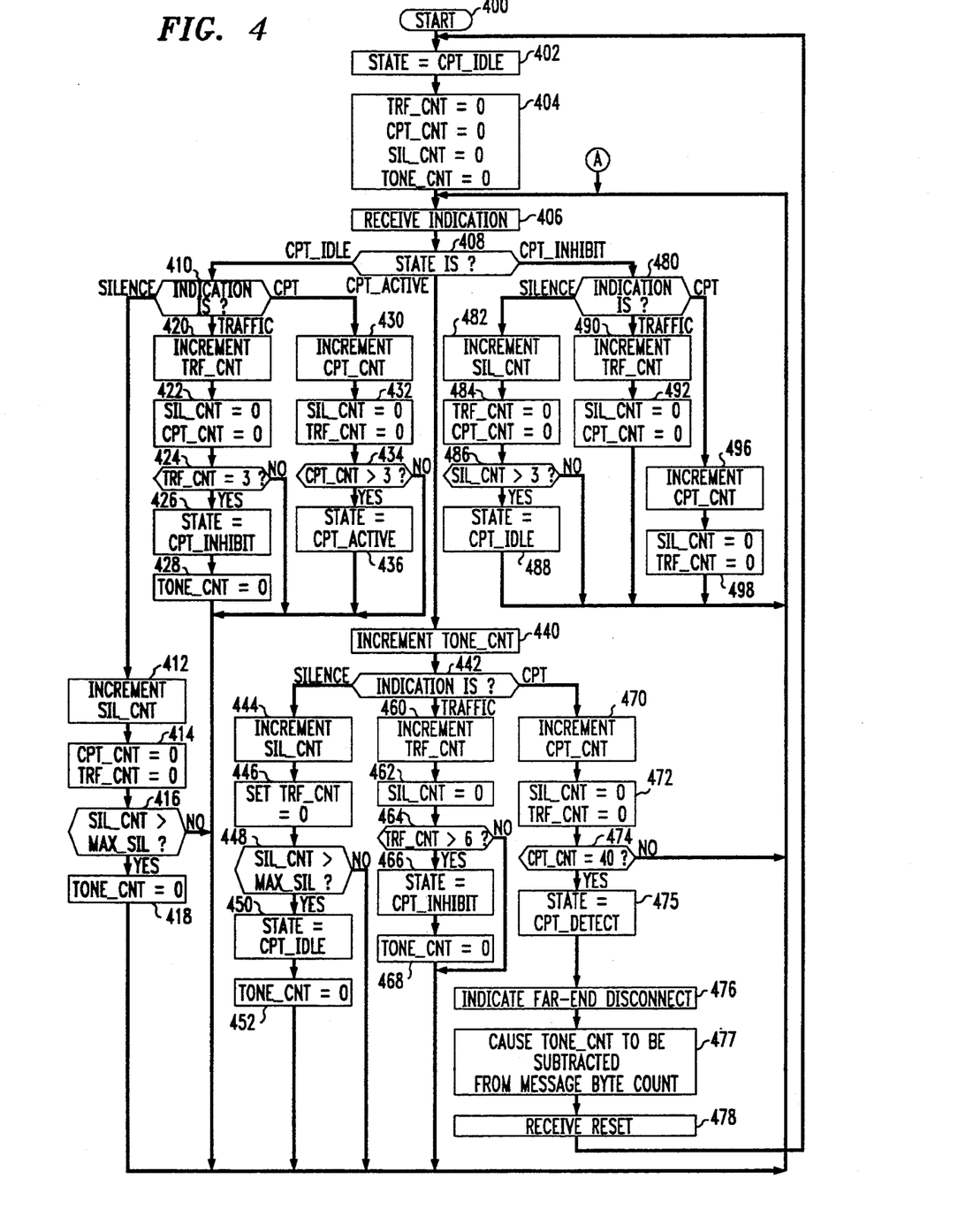
FIG. 4 is a flow diagram of the operation of an event detector function of the far-end disconnect detection arrangement of FIG. 2.

Function 240 is a state machine whose operational flow is diagrammed in FIG. 4. Upon start-up, at step 400, function 240 initializes by setting its present state at CPT-idle, in step 402, and by clearing all variables trf-cnt, CPT-cnt, sil-cnt, and tone-cnt, at step 404. Then, upon receipt of a silence, traffic, or CPT detection signal for a frame, at step 406, function checks its present state, at step 408. If the present state is CPT-idle, function 240 checks what the received indication is, at step 410. If it is silence, function 240 increments sil-cnt, at step 412, and clears CPT-cnt and trf-cnt, at step 414.

Function 240 then checks if sil-cnt exceeds a predetermined maximum silence count, such as 30, at step 416, and if the maximum predetermined silence count is exceeded, function 240 clears tone-cnt, at step 418. Function 240 then returns to step 406 to receive an indication for the next frame.

If the received indication in CPT-idle state is traffic, as determined at step 410, function 240 increments trf-cnt, at step 420, and clears sil-cnt and CPT-cnt, at step 422. Function 240 then checks if trf-cnt exceeds three, at step 424, and if so, function 240 changes the present state to CPT-inhibit, at step 426, and clears tone-cnt, at step 428. Function 240 then returns to step 406.

If the received indication in CPT-idle state is CPT, as determined at step 410, function 240 increments CPT-cnt, at step 430, and clears sil-cnt and trf-cnt, at step 432. Function 240 then checks if CPT-cnt exceeds three, at step 434, and if so, function 240 changes the present state to CPT-active, at step 436. Function 240 then returns to step 406.

Returning to step 408, if the present state is found to be CPT-inhibit, function 240 checks what the received indication is, at step 480. If it is silence, function 240 increments sil-cnt, at step 482, and clears trf-cnt and CPT-cnt, at step 484. Function 240 then checks if sil-cnt exceeds three, at step 486, and if so, function 240 changes the present state to CPT-idle, at step 488. Function 240 then returns to step 406.

If the received indication in CPT-inhibit state is traffic, as determined at step 480, function 240 increments trf-cnt, at step 490, and clears sil-cnt and CPT-cnt, at step 492. Function 240 then returns to step 406.

If the received indication in CPT-inhibit state is CPT, as determined at step 480, function 240 increments CPT-cnt, at step 496, and clears sil-cnt and trf-cnt, at step 498. Function 240 then returns to step 406.

Returning to step 408, if the present state is found to be CPT-active, function 240 increments tone-cnt, at step 440, and then checks what the received indication is, at step 442. If it is silence, function 240 increments sil-cnt, at step 444, and clears trf-cnt, at step 446. Function 240 then checks if sil-cnt exceeds the predetermined maximum silence count, at step 448, and if so, function 240 changes the present state to CPT-idle, at step 450, and clears tone-cnt, at step 452. Function 240 then returns to step 406.

If the received indication in CPT-active state is traffic, as determined at step 442, function 240 increments trf-cnt, at step 460, and clears sil-cnt, at step 462. Function 240 then checks if trf-cnt equals or exceeds six, at step 464, and if so, function 240 changes the present state to CPT-inhibit, at step 466, and clears tone-cnt, at step 462. Function 240 then returns to step 406.

If the received indication in CPT-active state is CPT, as determined at step 442, function 240 increments CPT-cnt, at step 470, and clears sil-cnt and trf-cnt, at step 472. Function 240 then checks if CPT-cnt equals a predetermined minimum count, such as 40, at step 474. If not, function 240 merely returns to step 406; if so, function 240 changes the present state to CPT-detect, at step 475. In CPT-detect state, function 240 generates an indication that far-end disconnect has been detected, at step 476. It also causes VMS 12 to subtract tone-cnt from the byte count of the recorded message, at step 477. Function 240 then awaits receipt of a reset signal, at step 478, and upon its receipt returns to step 402.

The disconnect indication causes VMS 12 to disconnect (drop) the call at the near end, in the conventional manner. The subtraction of the accompanying tone-cnt from the byte count of the recorded message causes VMS 12 to truncate the stored message at the resultant number of bytes, thereby removing any trace of the far-end call disconnect signal from the stored message.

Of course, various changes and modifications to the illustrative embodiment of the invention described above will be apparent to those skilled in the art. For example, the above-described analysis could be applied only to the frequency range in which the call-control tones of interest are expected to appear (that is, 300 Hz to 650 Hz), and not to the entire frequency range of the received signals. The analysis may also be used to distinguish far-end call-disconnect-indicative signals from traffic signals other than w ice, such as data. Furthermore, the analysis is not limited in its applicability to detecting disconnect-indicative signals, but may be employed to detect substantially any call-control signals for any purpose. Moreover, it can be used to classify signals into more than two populations, as long as the signals that are to be classified and distinguished from one another tend to cluster into separate groups. This is useful, for example, for identifying the particular type of call being received (such as voice, data, fax, TDD, etc.) from the signalling that accompanies the call. Also, once the analysis has identified and confirmed the receipt of a call-control signal, cadence information can be used to identify the precise call-control signal that has been :received. Or, multivariate classification techniques other than discriminant analysis may be used to analyze and distinguish the signal populations; techniques such as multiple regression, principal components, etc. And parameter thresholds can be derived empirically instead of through discriminant analysis. Such changes and modifications can be made without departing from the spirit and the scope of the invention and without diminishing its attendant advantages. It is therefore intended that such changes and modifications can be covered by the following claims.

We claim:

1. An arrangement for detecting information about a call that is indicated by an individual call-control signal, comprising:
   means for receiving signals carried by the call;
   means for performing a multivariate signal-classification on a whole range of frequencies of the received signals to detect any of a plurality of call-control signals among other signals carried by the call within the range of frequencies; and
   means responsive to a detection made by the multivariate signal-classification that the call carries any of the plurality of call-control signals within the frequency range, for indicating that information about the call that is indicated by said carried any of the plurality of call-control signals has been detected.

2. The arrangement of claim 1 wherein:
   the range of frequencies is an entire frequency range of the received signals.

3. The arrangement of claim 1 wherein:
   the performing means comprise
   means for performing a multivariate discrimination of call-control signals from other signals within the frequency range.

4. The arrangement of claim 1 wherein:
   the call extends between a far endpoint and a near endpoint,
   the receiving means receive signals carried by the call to the near endpoint, and
   the information is that the call has been disconnected at the far endpoint.

5. An arrangement for detecting, at a near end of a call that extends between the near end and a far end, a disconnection of the call at the far end indicated by a call-control signal received at the near end, comprising:
   means for receiving signals carried by the call to the near end;
   means for analyzing characteristics other than just energy of a whole range of frequencies of the received signals to distinguish by the analysis between traffic signals and call-control signals carried within the range of frequencies; and
   means responsive to a distinction made by the analysis indicating that the call carries a call-control signal within the frequency range, for treating the call as having been disconnected at the far end.

6. The arrangement of claim 5 wherein:
   the range of frequencies is one of (a) an entire frequency range of the received signals and (b) a range extending between about 300 Hz and about 650 Hz.

7. The arrangement of claim 5 wherein:
   the treating means are responsive to a distinction made by the analysis indicating that the call carries any one of a plurality of call-control signals within the frequency range, for treating the call as having been disconnected at the far end.

8. The arrangement of claim 5 wherein:
   the analyzing means comprise
   means for performing a multivariate classification of call-control signals from other signals within the frequency range.

9. The arrangement of claim 5 wherein:
   the analyzing means comprise
   means for determining a plurality of parameters that characterize signal type of the signals within the frequency range,
   means for combining the determined parameters according to a multivariate classification function to obtain a result, and
   means for comparing the obtained result against a threshold value to determine whether the obtained result represents a traffic signal or a call-control signal.

10. The arrangement of claim 5 wherein the call-control signals comprise at least busy tone, reorder tone, and dial tone.

11. An arrangement for detecting at a near end of a call any of a plurality of call-control signals indicative of far-end call disconnection that may be sent to the near end, in a telecommunications system having the call established between the near end and the far end, upon disconnection of the call at the far end, comprising:
   means for receiving signals carried by the call to the near end;
   means for analyzing a whole range of frequencies of the received signals to determine an amount of energy carried by the signals within the frequency range;

means responsive to the determined amount of energy exceeding a first threshold value, for analyzing characteristics indicative of signal type of the whole range of frequencies to distinguish by the analysis between traffic signals and call-control signals carried within the frequency range; and means responsive to a distinction made by the analysis indicating that the call is carrying a call-control signal within the frequency range, for treating the call as having been disconnected at the far end.

12. The arrangement of claim 11 further comprising:
means responsive to the determined amount of energy being below the first threshold value, for treating the call as carrying neither traffic signals nor call-control signals.

13. The arrangement of claim 11 wherein: the range of frequencies is one of (a) an entire frequency range of the received signals and (b) a range extending between about 300 Hz and about 650 Hz.

14. The arrangement of claim 11 wherein:
the means for analyzing characteristics comprise
means for performing a multivariate classification of call-control signals from other signals within the frequency range.

15. The arrangement of claim 11 wherein:
both analyzing means perform their functions periodically, upon signals received during each period; and
the treating means comprise
means responsive to a predetermined minimum number of distinctions made by the analysis indicating that the call is carrying a call-control signal within the frequency range, for treating the call as having been disconnected at the far end.

16. The arrangement of claim 15 for use with an apparatus for recording traffic carried by the call to the near end, wherein:
the treating means comprise
means for determining a length of time over which the predetermined minimum number of the determinations that the call is carrying a call-control signal was obtained, and
means responsive to the predetermined minimum number of the determinations that the call is carrying a call-control signal, for causing the recording apparatus to cease recording and to delete the determined length of time from an end of the recording, so as to delete the call-control signal from the recording.

17. The arrangement of claim 11 wherein:
the means for analyzing characteristics comprise
first means for determining a plurality of parameters that characterize signal type of the signals within the frequency range,
second means for combining the determined parameters according to a multivariate classification function to obtain a result,
third means for comparing the obtained result against a second threshold value,
fourth means responsive to the obtained result falling to one side of the second threshold value, for indicating that the signals within the frequency range are traffic signals, and
fifth means responsive to the obtained result falling to another side of the second threshold value, for indicating that the signals within the frequency range are call-control signals; and the treating means are responsive to an indication that the signals within the frequency range are call-control signals, for treating the call as having been disconnected at the far end.

18. The arrangement of claim 17 further comprising:
sixth means responsive to the determined amount of energy being below the first threshold value, for indicating that the call carries no signals within the frequency range.

19. The arrangement of claim 18 wherein
the first through sixth means perform their functions during every successive time interval with respect to signals received during a corresponding time interval.

20. An arrangement for detecting at a near end of a call any of a plurality of call-control signals indicative of far-end call disconnection that may be sent to the near end, in a telecommunications system having the call established between the near end and the far end, upon disconnection of the call at the far end, comprising:
means for receiving, in successive frames, signals carried by the call to the near end;
means for analyzing a whole range of frequencies of each frame of the received signals to determine for each frame (a) an amount of energy carried by the signals within the frequency range, (b) linear predictive coding (LPC) coefficients of signals within the frequency range, and (c) parameters that characterize signal type of signals within the frequency range;
means responsive to each determination that a frame's determined energy falls below a first threshold value, for indicating that the frame carries silence;
means responsive to each determination that a frame's determined energy exceeds the first threshold value, for combining the determined coefficients and parameters for the corresponding frame according to a multivariate classification function to obtain a result;
means for comparing each obtained result against a second threshold value;
means responsive to the obtained result falling to one side of the second threshold value, for indicating that the frame carries traffic signals;
means responsive to the obtained result falling to another side of the second threshold value, for indicating that the frame carries call-control signals; and
means responsive to a predetermined minimum number of indications of call-control signal-carrying frames, for treating the call as having been disconnected at the far end.

21. The arrangement of claim 20 wherein the multivariate classification function is $$|\overline{D}*x - \overline{u1}|$$

wherein
$\overline{D}$ is a discriminant array of predetermined values of parameter and coefficient weighting factors,
x is an observation vector comprising the determined coefficients and parameters,
* is a matrix-to-vector product operation,
— is a subtraction operation, $\bar{u}1$ is a centroid array of arithmetic mean values of transformed training observation vectors of call-control signals, and

| | is an Euclidean distance function.

22. The arrangement of claim 20 wherein:

the treating means comprise means responsive to a predetermined minimum number of indications of call-control signal-carrying frames not having interspersed there-between either more than a predetermined maximum number of sequential indications of silence-carrying frames or more than a predetermined maximum number of sequential indications of traffic-carrying frames, for treating the call as having been disconnected at the far end.

23. The arrangement of claim 20 for use with an apparatus for recording traffic carded by the call to the near end, wherein:

the treating means comprise means for determining a length of time over which the predetermined minimum number of the indications of call-control signal-carrying frames was obtained, and means responsive to the predetermined minimum number of the indications of call-control signal-carrying frames, for causing the recording apparatus to cease recording and to delete the determined length of time from an end of the recording, so as to delete the call-control signal from the recording.

24. A method of detecting information about a call that is indicated by an individual call-control signal, comprising the steps of:

receiving signals carried by the call;

performing a multivariate signal-classification on a whole range of frequencies of the received signals to detect any of a plurality of call-control control signals among other signals carried by the call within the range of frequencies; and in response to a detection made by the multivariate signal-classification that the call carries any of the plurality of call-control signals within the frequency range, indicating that information about the call that is indicated by said carried any of the plurality of call-control signals has been detected.

25. The method of claim 24 wherein:

the range of frequencies is an entire frequency range of the received signals.

26. The method of claim 24 wherein:

the step of performing comprises the step of performing a multivariate discrimination of call-control signals from other signals within the frequency range.

27. The method of claim 24 wherein:

the call extends between a far endpoint and a near endpoint, the step of receiving comprises the step of receiving signals carried by the call to the near endpoint, and the information is that the call has been disconnected at the far endpoint.

28. A method of detecting, at a near end of a call that extends between the near end and a far end, a disconnection of the call at the far end indicated by a call-control signal received at the near end, comprising the steps of:

in response to receipt of signals carried by the call to the near end, analyzing characteristics other than just energy of a whole range of frequencies of the received signals to distinguish by the analysis between traffic signals and call-control signals carried within the range of frequencies; and in response to a distinction made by the analysis indicating that the call carries a call-control signal within the frequency range, treating the call as having been disconnected at the far end.

29. The method of claim 28 wherein:

the range of frequencies is one of (a) an entire frequency range of the received signals and (b) a range extending between about 300 Hz and about 650 Hz.

30. The method of claim 28 wherein:

the step of treating occurs in response to a distinction made by the analysis indicating that the call carries any one of a plurality of call-control signals within the frequency range.

31. The method of claim 28 wherein:

the step of analyzing comprises the step of performing a multivariate classification of call-control signals from other signals within the frequency range.

32. The method of claim 28 wherein:

the step of analyzing comprises the steps of determining a plurality of parameters that characterize signal type of the signals within the frequency range, combining the determined parameters according to a multivariate classification function to obtain a result, and comparing the obtained result against a threshold value to determine whether the obtained result represents a traffic signal or a call-control signal.

33. The method of claim 28 wherein the call-control signals comprise at least busy tone, reorder tone, and dial tone.

34. A method of detecting at a near end of a call any of a plurality of call-control signals indicative of far-end call disconnection that may be sent to the near end, in a telecommunications system having the call established between the near end and the far end, upon disconnection of the call at the far end, comprising the steps of:

in response to receiving signals carried by the call to the near end, analyzing a whole range of frequencies of the received signals to determine an amount of energy carried by the signals within the frequency range;

in response to the determined amount of energy exceeding a first threshold value, analyzing characteristics indicative of signal type of the whole range of frequencies to distinguish by the analysis between traffic signals and call-control signals carried within the frequency range; and in response to a distinction made by the analysis indicating that the call is carrying a call-control signal within the frequency range, treating the call as having been disconnected at the far end.

35. The method of claim 34 further comprising:

in response to the determined amount of energy being below the first threshold value, treating the call as carrying neither traffic signals nor call-control signals.

36. The method of claim 34 wherein: the range of frequencies is one of (a) an entire frequency range of the received signals and (b) a range extending between about 300 Hz and about 650 Hz.

37. The method of claim 34 wherein:

the step of analyzing characteristics comprises the step of performing a multivariate classification of call-control signals from other signals within the frequency range.

38. The method of claim 34 wherein:
both steps of analyzing are repeated periodically, for signals received during each period; and
the step of treating comprises the step of
in response to a predetermined minimum number of distinction made by the analysis indicating that the call is carrying a call-control signal within the frequency range, treating the call as having been disconnected at the far end.

39. The method of claim 38 further comprising the step of
recording traffic carried by the call to the near end; wherein
the step of treating comprises the steps of
determining a length of time over which the predetermined minimum number of the determinations that the call is carrying a call-control signal was obtained, and
in response to the predetermined minimum number of the determinations that the call is carrying a call-control signal, ceasing the step of recording, and deleting the determined length of time from an end of the recording so as to delete the call-control signal from the recording.

40. The method of claim 34 wherein:
the step of analyzing characteristics comprises the steps of
(A) determining a plurality of parameters that characterize signal type of the signals within the frequency range,
(B) combining the determined parameters according to a multivariate classification function to obtain a result,
(C) comparing the obtained result against a second threshold value,
(D) in response to the obtained result falling to one side of the second threshold value, indicating that the signals within the frequency range are traffic signals, and
(E) in response to the obtained result falling to another side of the second threshold value, indicating that the signals within the frequency range are call-control signals; and
(F) the step of treating is responsive to an indication that the signals within the frequency range are call-control signals.

41. The method of claim 40 further comprising the step of:
(G) in response to the determined amount of energy being below the first threshold value, indicating that the call carries no signals within the frequency range.

42. The method of claim 41 wherein
the steps (A) through (G) are performed during every successive time interval with respect to signals received during a corresponding time interval.

43. A method of detecting at a near end of a call any of a plurality of call-control signals indicative of far-end call disconnection that may be sent to the near end, in a telecommunications system having the call established between the near end and the far end, upon disconnection of the call at the far end, comprising the steps of:
receiving, in successive frames, signals carried by the call to the near end;
analyzing a whole range of frequencies of each frame of the received signals to determine for each frame
(a) an amount of energy carried by the signals within the frequency range, (b) linear predictive coding (LPC) coefficients of signals within the frequency range, and (c) parameters that characterize signal type of signals within the frequency range;
in response to each determination that a frame s determined energy falls below a first threshold value, indicating that the frame carries silence;
in response to each determination that a frame s determined energy exceeds the first threshold value, combining the determined coefficients and parameters for the corresponding frame according to a multivariate classification function to obtain a result;
comparing each obtained result against a second threshold value;
in response to the obtained result falling to one side of the second threshold value, indicating that the frame carries traffic signals;
in response to the obtained result falling to another side of the second threshold value, indicating that the frame carries call-control signals; and
in response to a predetermined minimum number of indications of call-control signal-carrying frames, treating the call as having been disconnected at the far end.

44. The method of claim 43 wherein the multivariate discrimination function is $$|\overline{D}*x - \overline{u1}|$$

wherein
$\overline{D}$ is a discriminant array of predetermined values of parameter and coefficient weighting factors,
x is an observation vector comprising the determined coefficients and parameters,
* is a matrix-to-vector product operation,
— is a subtraction operation,
$\overline{u1}$ is a centroid array of arithmetic mean values of transformed training observation vectors of call-control signals, and
| | is an Euclidean distance function.

45. The method of claim 43 wherein:
the step of treating comprises the step of
in response to a predetermined minimum number of indications of call-control signal-carrying frames not having interspersed there-between either more than a predetermined maximum number of sequential indications of silence-carrying frames or more than a predetermined maximum number of sequential indications of traffic-carrying frames, treating the call as having been disconnected at the far end.

46. The method of claim 43 further comprising the step of
recording traffic carried by the call to the near end; wherein
the step of treating comprises the steps of
determining a length of time over which the predetermined minimum number of the indications of call-control signal-carrying frames was obtained, and
in response to the predetermined minimum number of the indications of call-control signal-carrying frames, ceasing the step of recording, and deleting the determined length of time from an end of the recording so as to delete the call-control signal from the recording.

* * * * *